US009760797B2

(12) United States Patent
Feng et al.

(10) Patent No.: US 9,760,797 B2
(45) Date of Patent: Sep. 12, 2017

(54) PROTECTING SPECIFIC INFORMATION (71) Applicant: International Business Machines Corporation, Armonk, NY (US)

(72) Inventors: Hao Feng, Beijing (CN); Sheng Yan Sun, Beijing (CN); Jun Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 14/832,140

(22) Filed: Aug. 21, 2015

(65) Prior Publication Data
US 2016/0055393 A1 Feb. 25, 2016

(30) Foreign Application Priority Data

Aug. 22, 2014 (CN) .......................... 2014 1 0418383

(51) Int. Cl.
*G06K 9/00* (2006.01)
*G06K 9/46* (2006.01)
*G06K 9/62* (2006.01)
*G06T 7/13* (2017.01)

(52) U.S. Cl.
CPC .............. *G06K 9/6202* (2013.01); *G06T 7/13* (2017.01); *G06K 2009/6213* (2013.01)

(58) Field of Classification Search
CPC ...... G06K 9/6202; G06K 9/48; G06T 7/0085; G06T 7/0083; G06T 2207/10016; G06T 5/001
USPC ....... 382/100, 141, 145, 147, 149, 162, 165, 382/181, 190, 195, 205, 168, 172, 199
See application file for complete search history.

(56) References Cited

U.S. PATENT DOCUMENTS

| 6,115,495 A * | 9/2000 | Tachikawa | G06K 9/00463 382/165 |
| 6,640,009 B2 * | 10/2003 | Zlotnick | G06K 9/00449 358/403 |
| 6,823,203 B2 | 11/2004 | Jordan | |

(Continued)

FOREIGN PATENT DOCUMENTS

WO  WO2013136324 A1  9/2013

OTHER PUBLICATIONS

"MST Redact," MS Technology, Inc., copyright 2015, 2 pages. http://www.ms-technology.com/mst/viewing-solutions/redact/#.

(Continued)

*Primary Examiner* — Sheela C Chawan
(74) *Attorney, Agent, or Firm* — Yee & Associates, P.C.; Jeffrey S. Labaw (57) ABSTRACT

The present invention discloses a method for protecting specific information, comprising: receiving an image containing specific information; identifying boundaries of the image; matching the image with a predetermined image template based on the boundaries so as to determine a specific information region of the image; and performing predetermined processing on the specific information region of the image to be presented in response to determining the specific information region of the image, so as to protect the specific information. The method of the invention for protecting specific information can efficiently protect relevant specific information without identifying detailed semantic content in an image.

18 Claims, 6 Drawing Sheets

(56) References Cited

U.S. PATENT DOCUMENTS

| | | | |
|---|---|---|---|
| 8,014,604 B2 * | 9/2011 | Tzadok | G06K 9/00852 |
| | | | 382/177 |
| 8,345,101 B2 * | 1/2013 | Bobbitt | G06K 9/3233 |
| | | | 348/143 |
| 8,612,854 B2 | 12/2013 | Eisen et al. | |
| 2009/0100527 A1 * | 4/2009 | Booth | G06F 21/6245 |
| | | | 726/27 |
| 2012/0033892 A1 | 2/2012 | Blenkhorn et al. | |
| 2013/0179807 A1 | 7/2013 | Day | |

OTHER PUBLICATIONS

"Sensitive Data Protection with Image Resolution," Artsyl Technologies, Inc., copyright 2015, 1 page. http://www.artsyltech.com/sc_redaction.html.

"VirtualViewer—Redact Documents and Images," Snowbound Software, copyright 2015, 2 pages. http://www.snowbound.com/products/document-viewer/redaction.

* cited by examiner

PROTECTING SPECIFIC INFORMATION

CROSS-REFERENCE TO RELATED APPLICATION(S)

This application claims the benefit of priority to Chinese Patent Application No. CN201410418383.4, filed Aug. 22, 2014, the entire contents of which are incorporated herein by reference.

BACKGROUND

The present invention relates to a computer information processing method, and more specifically, to a method and system for protecting specific information.

In the current database system or other big data systems, in addition to sensitive data of common digital, text formatting, user sensitive image information is increasingly stored in the form of an object such as a picture, and in particular, there is extremely sensitive personal information in an image such as a copy or a scanned copy of an ID card, a bank card, a medical record, etc. When such information is displayed in a bank, healthy and other industry data retrieval system, on one hand, identity and right of the owner of the image needs to be audited by means of content carried by the image so that they could be used in related business, e.g., ID authenticity of a user at a counter is determined by looking over a user's photo on the ID card and checking birth date on the ID card; on the other hand, the sensitive information is very likely to be inappropriately used.

Thus, there is a need for a method in which when most valuable and sensitive information (e.g., ID-type information such as identity card number, bank card number) is being transmitted, read, presented by a front-end system via an application program or Http, it will be automatically covered. Similar situation also exists during transmission via FTP or other file management system or internet, i.e., there is a risk of being attacked and abused when sensitive, personalized and private content is being transmitted, stored and presented. All current solutions are to learn content pattern of sensitive information to be protected, analyze the picture content, find out content that matches with a set pattern of content to be protected, and then cover the content. It is very difficult to search for precisely matching content in a picture, particularly for such image content with unfixed content as ID card number, credit card number, and the like; and it becomes more difficult to identify detailed semantic content in an image when there is a certain defect in the image itself.

SUMMARY

The present invention provides a method and system for protecting specific information.

According to one aspect of the present invention, there is provided a method for protecting specific information, comprising: receiving an image containing specific information; identifying boundaries of the image; matching the image with a predetermined image template based on the boundaries so as to determine a specific information region of the image; and performing predetermined processing on the specific information region of the image in response to determining the specific information region of the image so as to protect the specific information.

According to another aspect of the present invention, there is provided a system for protecting specific information, comprising: a receiving means configured to receive an image containing specific information; an identifying means configured to identify boundaries of the image; a specific information region determining means configured to match the image with a predetermined image template based on the boundaries so as to determine a specific information region of the image; and a specific information protecting means configured to perform predetermined processing on the specific information region of the image in response to determining the specific information region of the image so as to protect the specific information.

In the present invention, there is no need to analyze detailed semantic content of an image—instead, sensitive data is positioned and protected according to a region where the sensitive data is located and a distance between a feature region and boundaries. Moreover, the invention does not directly determine content—instead, it performs positioning by acquiring a position of the feature region and a relative distance, performance in finding out matching is improved.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
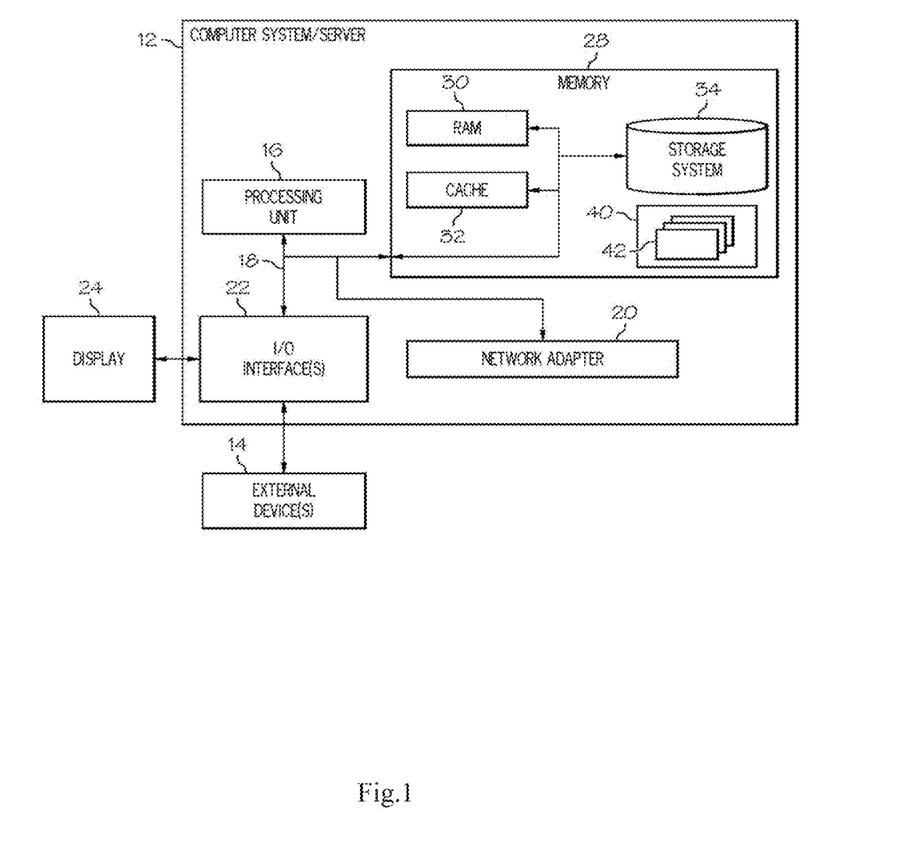
FIG. 1 shows a diagram of an exemplary computer system/server 12 which is applicable to implement the embodiments of the present invention.

Referring now to FIG. 1, in which a block diagram of an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
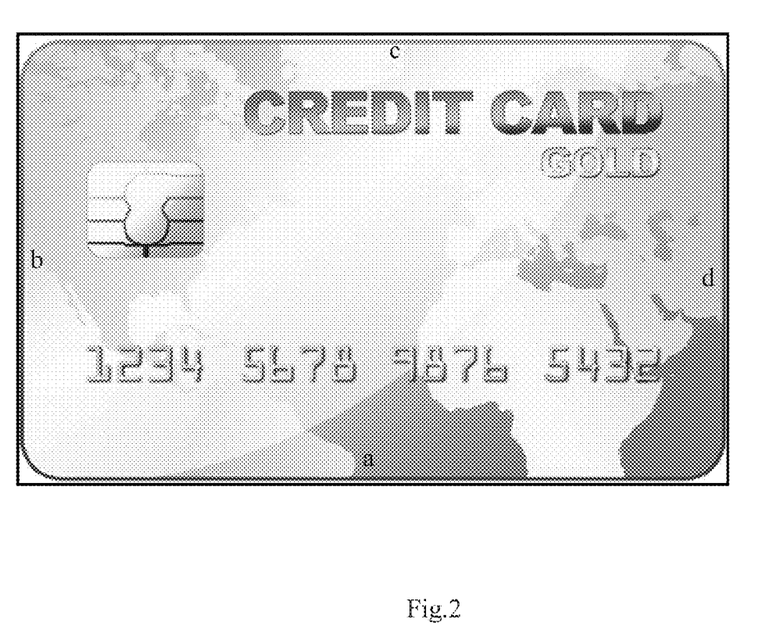
FIG. 2 shows an example of a credit card used in the present invention.

In view of the fact that all prior art need to identify detailed information content in an image to determine what kind of information is to be protected, thus leading to the technical defect that there is difficulty in semantic identification, the applicant has found after long-term research and practice that all the currently processed images have certain regularity. Taking a credit card shown in FIG. 2 for example, in which when a user submitting a copy or a scanned copy of the credit card, it is required by the bank that at least three of four boundaries of the copy or the scanned copy of the credit card are clear. Therefore, the applicant has set forth, through another way, a method for identifying a feature region and a specific information region in an image based on boundaries of the image, which avoids the technical defect of requiring semantic identification in the prior art, and achieves a technical effect beyond expectation of those skilled in the art.

Figure 3:
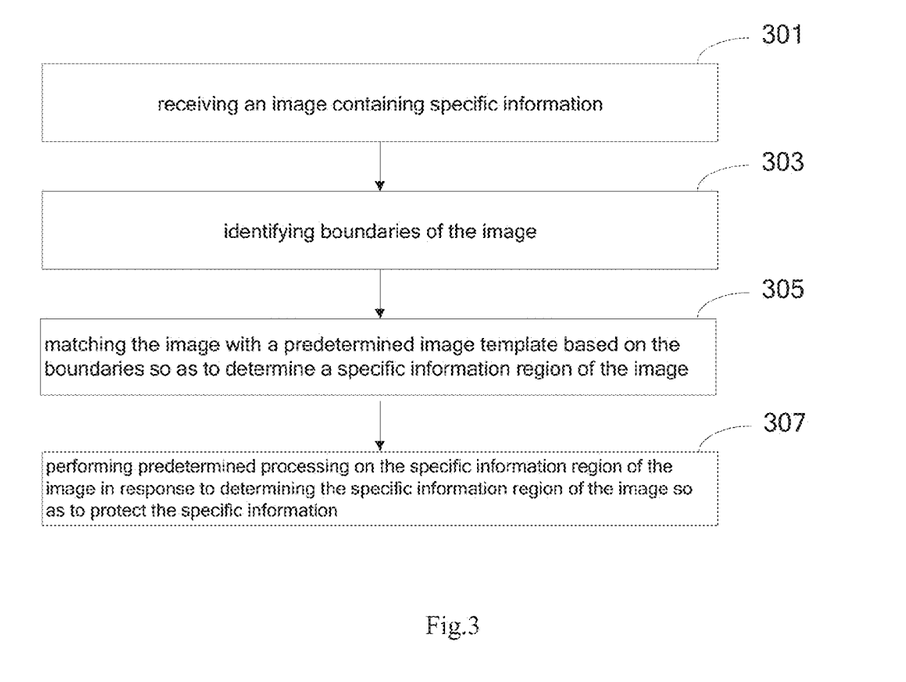
FIG. 3 shows a first embodiment of a method for protecting specific information of the present invention.

With reference now to FIG. 3, a first embodiment of a method for protecting specific information of the present invention is shown. In step 301, receiving an image containing specific information. Wherein, the specific information may be various kinds of information, e.g. name of a person, personal ID card number, personal address, sickness condition etc., which requires protection by a user or according to a protocol between a user and an enterprise or the like. The form of the image may include but not limited to an electronic image formed from a copy, a fax, a scanned copy. etc. The image is preferably represented by grayscale, and with regard to a received colored image, it is preferably converted into an image represented by grayscale. In step 303, identifying boundaries of the image. As noted above, an image applicable to the present embodiment has explicit boundaries; hence boundaries of the received image may be identified based on the image. Those skilled in the art will appreciate that, various existing or further image boundary identification methods may be employed, for example, Markov random field model, simulated annealing algorithm, MAP criteria and the like known to those skilled in the art may be used to perform boundary detection, so as to obtain pixel-point-based coordinate value representation of each boundary. Taking FIG. 2 for example, boundary a may be represented as ((0,0), (80,0)), boundary b may be represented as ((0,0), (0,50)), and by analogy, boundary c is represented as ((0,50), (80,50)) and d is represented as ((80, 50), (80,0)) . . . . Preferably, for a common regular image (such as bank card, ID card, etc), merely three boundaries may be identified and recorded, such as boundaries a, b and c, and the main reason for considering three boundaries is that, in practice, an angle of the scanned image may be incomplete (unclosed), thus a certain virtual original point is taken as (0,0) (e.g. an intersection point of extension lines of boundaries a and b) and three boundaries are recorded.

In step 305, matching the image with a predetermined image template based on the boundaries so as to determine a specific information region of the image. In the present invention, an image template of a same type as the image will be pre-stored, e.g. an input new credit card image corresponds to a pre-stored image template for credit card. In the image template, a feature region and a specific information region are recorded. The feature region is used to identify whether the image and the image template belong to a same type of image, and the specific information region is a region for recording specific information requiring protection in this type of image. As to how to generate a predetermined image template and how to specifically perform matching, it will be illustrated in detail in a plurality of preferred embodiments hereinafter. In step 307, performing predetermined processing on the specific information region of the image in response to determining the specific information region of the image so as to protect the specific information. Wherein, the predetermined processing includes but is not limited to any one or more of the following methods:

(1) performing pseudo digital/alphabet processing on the region, e.g., 11010519660101123x→12312312341212abcd, in case that sensitive region is an ID card, a bank card ID, etc.;

(2) sketching out a location or a distribution where image grayscale varies greatly, performing fuzzy processing, sharpening a location possessing much noise, broadening a marginal region, enhancing bright and dark contrast, performing secondary segmentation on the marginal region after reversion and augmenting contrast, etc.

Through the above processing, the specific information desired to be protected is appropriately protected and other information can be applied sufficiently.

Figure 4:
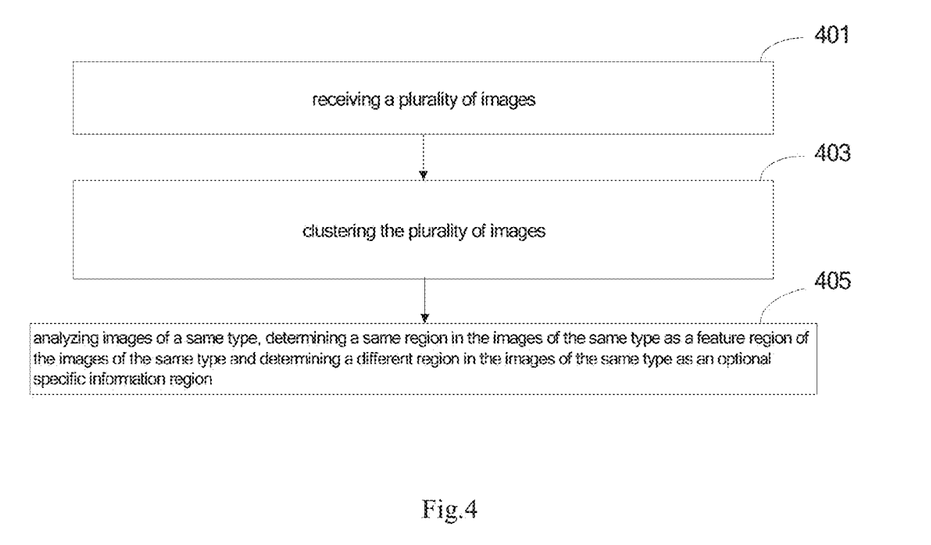
FIG. 4 shows a first embodiment for generating a predetermined image template.

FIG. 4 shows a first embodiment for generating a predetermined image template. In step 401, receiving a plurality of images, which act as samples for training an image template. In step 403, clustering the plurality of images. The step of clustering the plurality of images comprises performing image machine learning on the plurality of images, and classifying the plurality of images according to a mutual matching degree of the plurality of images. Wherein those skilled in the art will appreciate that various existing or future machine learning algorithms may be used in the above steps, such as back propagation neural network, ensemble learning, various support vector machines algorithms, and a more generalized maximum interval method known to those skilled in the art, as well as various probabilistic methods based on Bayesian decision theory, e.g. conditional random field and variation thereof.

In step 405, analyzing images of a same type, determining a same region in the images of the same type as a feature region of the images of the same type and determining a different region in the images of the same type as an optional specific information region. Firstly, a historical learning picture is grayed followed by sharpening the grayed picture, e.g. a pixel point of the image is adjusted and sharpened from certain gray value R to black and white (#000000, #ffffff) ends, where a value greater than the gray value R is adjusted as black and a value smaller than the gray value R is adjusted as white. Then, all the black and white pictures are compared iteratively, thus, it is a pixel-by-pixel comparison. For example, a first picture is compared with a second picture, the picture includes 10,000 pixel points in total; comparing black regions, when a similarity level of pixels at a same position of the regions is above 90% (of course, 90% is merely illustrative herein, those skilled in the art can adjust the value according to actual need, e.g. 85% or 95%), it is regarded as a feature region. Other black regions are optional undetermined information regions.

Figure 5:
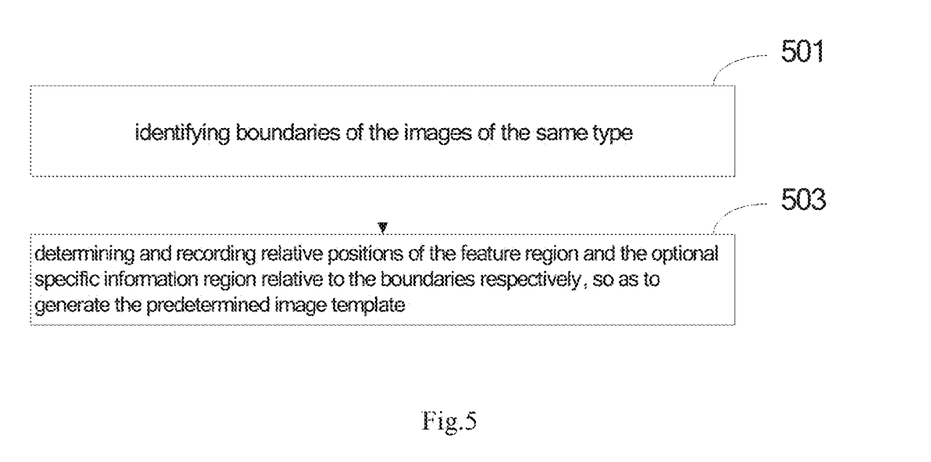
FIG. 5 shows a second embodiment for generating a predetermined image template.
Figure 6:
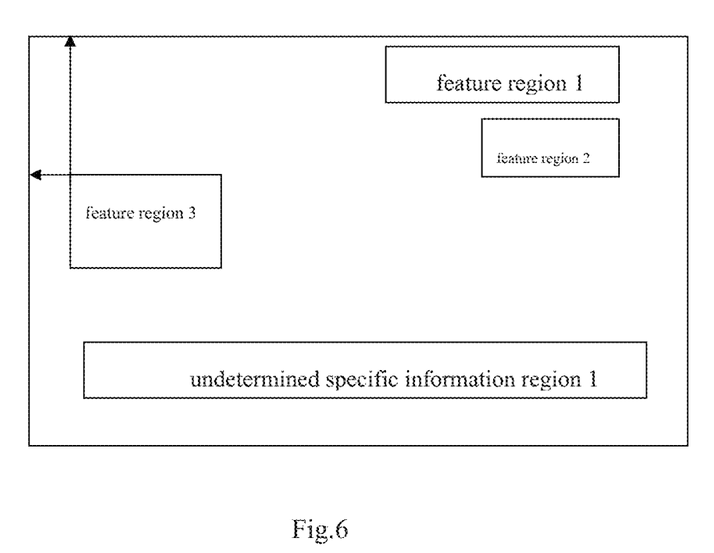
FIG. 6 shows a credit card image model learned from the credit card in FIG. 2.

Preferably, as illustrated in a second embodiment for generating a predetermined image template shown in FIG. 5, in step 501, identifying boundaries of the images of the same type, and in step 503, determining and recording relative positions of the feature region and the optional specific information region relative to the boundaries respectively, so as to generate the predetermined image template. Taking the identified boundaries as references, position and size of the feature region may be marked by calculating a pixel-based distance between the feature region and the boundaries and determining a pixel-based size of the feature region. For example, FIG. 6 shows a credit card image model learned from the credit card in FIG. 2, and wherein location coordinate of a feature region 3 relative to the boundaries may be represented as ((5,20), (5,30), (30,30), (30,20)). As the optional specific information region represents a different region in images of a same type, and these regions are different, for example, a person's name may be two characters or three characters, which cannot be concluded through machine learning, thus the largest one of the images of the same type for the region may be taken as an optional specific information region of the template, for instance, it is found through machine learning that a name containing four characters is the largest region, then the largest region is taken as one of the optional specific information regions of the template so as to achieve a maximum protection degree. Since sometime an image used as a sample may have defect such as inclination, reversion relative to its background image (for example, generally when submitting a copy of an ID card to a bank, people will copy the ID card on an A4 paper, the ID card often tends to incline or reverse relative to the A4 paper acting as background image), preferably, pre-processing like rotation may be performed on the image during machine learning. As how to specifically determine whether an image is inclined or reversed and perform image rotation belong to commonly used techniques known to those skilled in the art, they will not be repeated here for brevity. It may also be considered to record position of an undetermined specific information region relative to a feature region as relative position of the undetermined specific information region, and then, position of the undetermined specific information region may be determined if position of a corresponding feature region is found; of course, location information may also contain size data of the region, and to finally determine the specific information region of the image template, one of the following manners may be employed: receiving a designation of a specific information region by a user, thereby determining the specific information region of the predetermined image template from the optional specific information region; or determining the optional specific information region as the specific information region of the predetermined image template.

Figure 7:
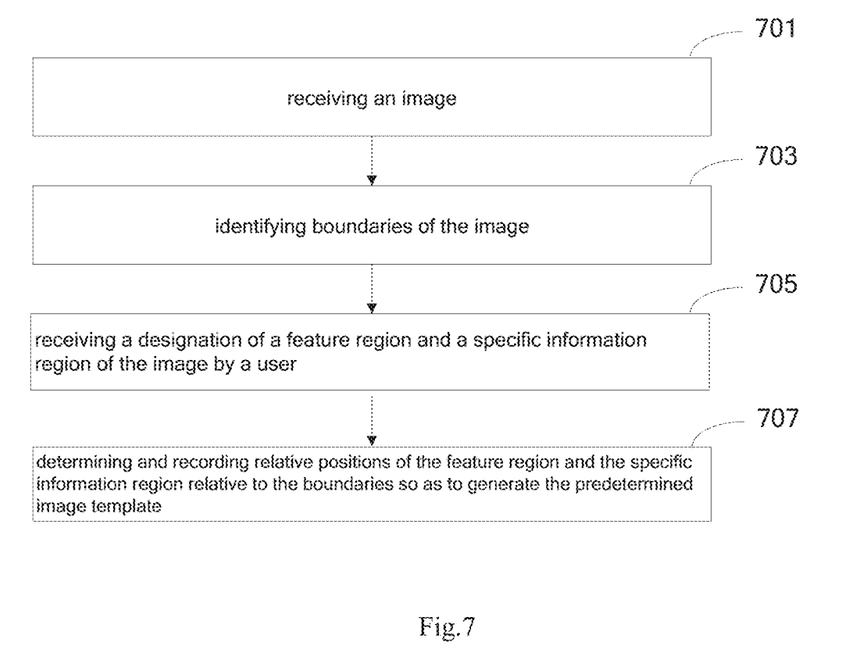
FIG. 7 shows a third embodiment for generating a predetermined image template.

FIG. 7 shows a third embodiment for generating a predetermined image template. In step 701, receiving an image. The image is taken as a basis for the image template. In step 703, identifying boundaries of the image. In step 705, receiving a designation of a feature region and a specific information region of the image by a user. Preferably, the embodiment may present the image to the user, and the user marks the feature region and the specific information region of the image designated by himself/herself in a manner of what you see is what you get, e.g., through an input manner such as a keyboard, a mouse, a touch screen, or the like. The designation by the user may be as shown in FIG. 6. In step 707, determining and recording relative positions of the feature region and the specific information region relative to the boundaries so as to generate the predetermined image template. Based on the identified boundaries, relative positions of the feature region and the optional specific information region relative to the boundaries are determined and recorded. Since in the present application, determining coordinate of a determined region and relative pixel location relative to the boundaries according to input device of a user belongs to commonly used techniques known to those skilled in the art, they will not be repeated here for brevity. Preferably, in consideration of the uncertainty of the specific information region, if there is no regional conflict with other feature regions and the specific information region, range of the specific information region may be appropriately enlarged based on designation of the user, which can avoid such situation that part of the specific information is missed from protection when a larger specific information region is encountered due to the specific information region of the user based sample image being relatively small.

Figure 8:
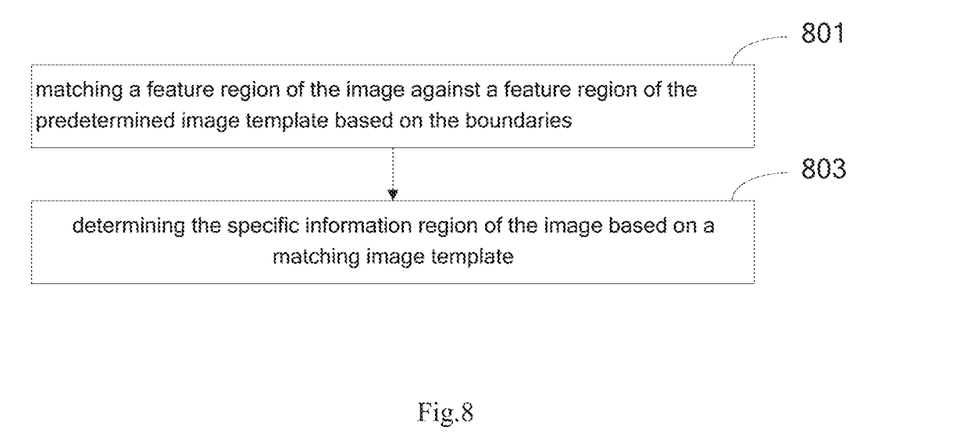
FIG. 8 shows a first embodiment of the present invention for specifically matching an image with an image template.

FIG. 8 shows a first embodiment of the present invention for specifically matching an image with an image template. In step 801, matching a feature region of the image against a feature region of the predetermined image template based on the boundaries. Preferably, considering that although the image to be matched has explicit boundaries, detailed image content may have problem such as color is too shallow, missing a small portion of the content, etc., pre-processing of sharpening is performed on the image, then a corresponding region in the image is determined based on boundaries of the image according to location and region size of the feature region recorded in the predetermined image template, which can be called as heat zone (feature region) of the image to correspond to the feature region in the image template. Each heat zone is a set of vector data containing coordinate value and grayscale value of a position of a pixel relative to the boundaries, and representation manner of the feature region 3 may be referred to for coordinate value representation. Then, a pixel-by-pixel comparison is performed on the image in accordance with a heat zone location and a corresponding feature region in the image template, and if similarity is less than 90% (of course, 90% is merely illustrative herein, those skilled in the art can adjust the value according to actual need, e.g. 85% or 95%), it is considered to not conform to the image template, or on the contrary, it may be considered that the image template and the image are matching. In step 803, determining the specific information region of the image based on a matching image template. When the image template matching with the image is finally determined, namely the image and the image template belong to images of a same type, if what is recorded in the image template is relative location information of the specific information region relative to the feature region, the specific information region of the image may be determined based on the feature region location recorded in the image template; and if what is recorded in the image template is location of the specific information region relative to the image boundaries, location of the specific information region of the image may be directly determined via location of the specific information region recorded in the image template.

Figure 9:
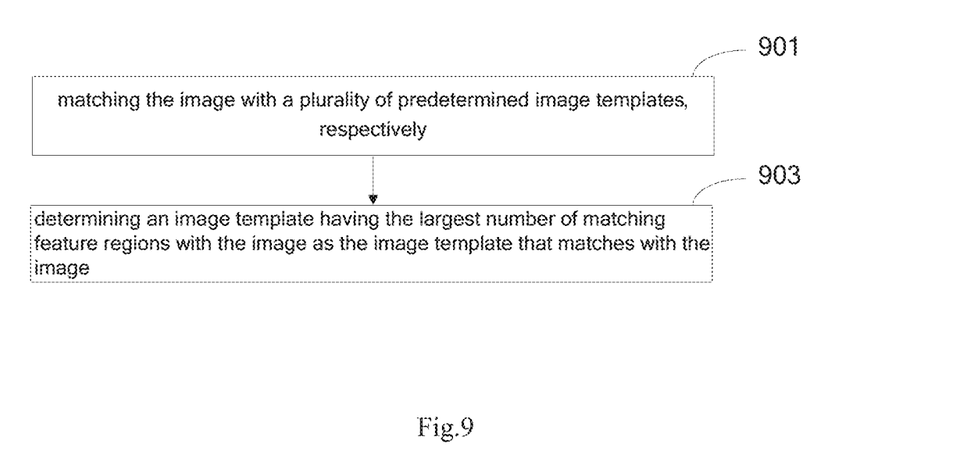
FIG. 9 shows a second embodiment of the present invention for specifically matching an image with an image template.

FIG. 9 shows a second embodiment of the present invention for matching an image with an image template. Preferably, an enterprise such as a bank often issues a plurality of bank (credit) card products, which means that a plurality of image templates are established. Accordingly, there is a need to determine which image template belongs to a same type as the image. In step 901, matching the image with a plurality of predetermined image templates, respectively. The matching method may be that as introduced above, in which feature region of each image template capable of being matched with the image is determined. In step 903, determining an image template having the largest number of matching feature regions with the image as the image template that matches with the image.

Figure 10:
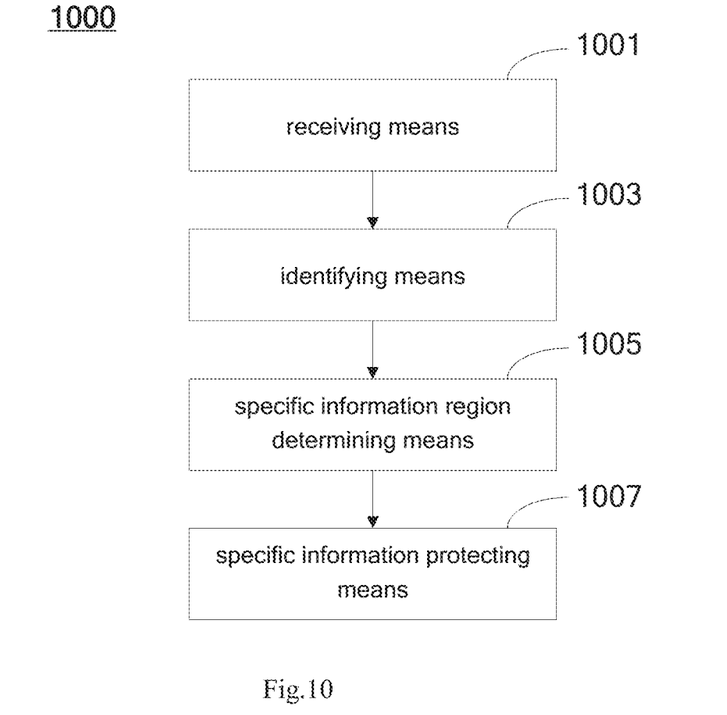
FIG. 10 shows a block diagram of a system for protecting specific information of the present invention.

FIG. 10 shows a system 1000 of the present invention for protecting specific information, comprising: a receiving means 1001 configured to receive an image containing specific information; an identifying means 1003 configured to identify boundaries of the image; a specific information region determining means 1005 configured to match the image with a predetermined image template based on the boundaries so as to determine a specific information region of the image; and a specific information protecting means 1007 configured to perform predetermined processing on the specific information region of the image in response to determining the specific information region of the image so as to protect the specific information.

Preferably, wherein the specific information region determining means comprises: a matching means configured to match a feature region of the image against a feature region of the predetermined image template based on the boundaries; and a determining means configured to determine the specific information region of the image based on a matching image template.

Preferably, wherein the matching means comprises: a respective matching means configured to match the image with a plurality of predetermined image templates, respectively; and a matching image template determining means configured to determine an image template having the largest number of matching feature regions with the image as the image template that matches with the image.

Preferably, the system further comprising: an image receiving means configured to receive a plurality of images; a clustering means configured to cluster the plurality of images; and an analyzing means configured to analyze images of a same type, determine a same region in the images of the same type as a feature region of the images of the same type and determine a different region in the images of the same type as an optional specific information region.

Preferably, wherein the analyzing means further comprises: a boundary identifying means configured to identify boundaries of the images of the same type; and an image template generating means configured to determine and record relative positions of the feature region and the optional specific information region relative to the boundaries respectively, so as to generate the predetermined image template.

Preferably, the system further comprising one of: receiving a designation of a specific information region by a user, thereby determining the specific information region of the predetermined image template from the optional specific information region; or determining the optional specific information region as the specific information region of the predetermined image template.

Preferably, the system further comprising: a second image receiving means configured to receive an image; a second boundary identifying means configured to identify boundaries of the image; a second receiving means configured to receive a designation of a feature region and a specific information region of the image by a user; and a second image template generating means configured to determine and record relative positions of the feature region and the specific information region relative to the boundaries so as to generate the predetermined image template.

Preferably, wherein the identifying means further comprises: a third boundary identifying means configured to identify three boundaries of the image.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for protecting specific information, comprising:
receiving an image containing the specific information;
identifying boundaries of the image;
matching the image with a predetermined image template based on the boundaries so as to determine a specific information region of the image; and
performing predetermined processing on the specific information region of the image in response to determining the specific information region of the image so as to protect the specific information, wherein the step of matching the image with a predetermined image template to determine a specific information region of the image comprises:
matching a feature region of the image against a feature region of the predetermined image template based on the boundaries; and
determining the specific information region of the image based on a matching image template.

2. The method according to claim 1, wherein the step of matching a feature region of the image against a feature region of the predetermined image template comprises:
matching the image with a plurality of predetermined image templates, respectively; and
determining an image template having the largest number of matching feature regions with the image as the image template that matches with the image.

3. The method according to claim 1, further comprising:
receiving a plurality of images:
clustering the plurality of images; and
analyzing images of a same type, determining a same region in the images of the same type as a feature region of the images of the some type and determining a different region in the images of the same type as an optional specific information region.

4. The method according to claim 3, wherein the step of analyzing images of a same type, determining a same region in the images of the same type as a feature region of the images of the same type and determining a different region in the images of the same type as an optional specific information region further comprises:
identifying boundaries of the images of the same type; and
determining and recording relative positions of the feature region and the optional specific information region relative to the boundaries respectively, so as to generate the predetermined image template.

5. The method according to claim 4, further comprising one of:
receiving a designation of a specific information region by a user, thereby determining the specific information region of the predetermined image template from the optional specific information region; or
determining the optional specific information region as the specific information region of the predetermined image template.

6. The method according to claim 1, further comprising:
receiving another image;
identifying boundaries of the another image;
receiving a designation of a feature region and a specific information region of the another image by a user; and
determining and recording relative positions of the feature region and the specific information region relative to the boundaries so as to generate the predetermined image template.

7. The method according to claim 1, wherein the step of identifying boundaries of the image comprises:
identifying three boundaries of the image when an angle of the image is incomplete.

8. The method according to claim 1, wherein the specific information is protected without identifying detailed semantic content in the image.

9. A system for protecting specific information, comprising:
a data processor coupled to a memory having program instructions stored therein that are configured to perform, when executed by the data processor, steps of:
receiving an image containing the specific information;
identifying boundaries of the image;
matching the image with a predetermined image template based on the boundaries so as to determine a specific information region of the image; and
performing predetermined processing on the specific information region of the image in response to determining the specific information region of the image so as to protect the specific information, wherein the step of matching the image with a predetermined image template to determine a specific information region of the image comprises:
matching a feature region of the image against a feature region of the predetermined image template based on the boundaries; and
determining the specific information region of the image based on a matching image template.

10. The system according to claim 9, wherein the step of matching a feature region of the image against a feature region of the predetermined image template comprises:
matching the image with a plurality of predetermined image templates, respectively; and
determining an image template having the largest number of matching feature regions with the image as the image template that matches with the image.

11. The system according to claim 9, further comprising:
receiving a plurality of images;
clustering the plurality of images; and
analyzing images of a same type, determining a same region in the images of the same type as a feature region of the images of the same type and determining a different region in the images of the same type as an optional specific information region.

12. The system according to claim 11, wherein the step of analyzing images of a same type, determining a same region in the images of the same type as a feature region of the images of the same type and determining a different region in the images of the same type as an optional specific information region further comprises:
identifying boundaries of the images of the same type; and
determining and recording relative positions of the feature region and the optional specific information region relative to the boundaries respectively, so as to generate the predetermined image template.

13. The system according to claim 12, further comprising one of:
receiving a designation of a specific information region by a user, thereby determining the specific information region of the predetermined image template from the optional specific information region; or determining the optional specific information region as the specific information region of the predetermined image template.

14. The system according to claim 9, further comprising:
receiving another image;
identifying boundaries of the another image;
receiving a designation of a feature region and a specific information region of the another image by a user; and
determining and recording relative positions of the feature region and the specific information region relative to the boundaries so as to generate the predetermined image template.

15. The system according to claim 9, wherein the step of identifying boundaries of the image comprises:
identifying three boundaries of the image when an angle of the image is incomplete.

16. The system according to claim 9, wherein the specific information is protected without identifying detailed semantic content in the image.

17. A computer program product for protecting specific information comprising one or more non-transitory computer readable storage medium(s) having computer readable program code thereon that is configured to perform steps of:
receiving an image containing the specific information;
identifying boundaries of the image;
matching the image with a predetermined image template based on the boundaries so as to determine a specific information region of the image; and
performing predetermined processing on the specific information region of the image in response to determining the specific information region of the image so as to protect the specific information, wherein the step of matching the image with a predetermined image template to determine a specific information region of the image comprises:
matching a feature region of the image against a feature region of the predetermined image template based on the boundaries; and
determining the specific information region of the image based on a matching image template.

18. The computer program product according to claim 17, wherein the specific information is protected without identifying detailed semantic content in the image.

* * * * *